United States Patent [19]

Hasegawa et al.

[11] Patent Number: 5,417,476
[45] Date of Patent: May 23, 1995

[54] DISK WHEEL FOR AUTOMOBILE

[75] Inventors: Tsutomu Hasegawa; Kiichi Shimizu, both of Anjo, Japan

[73] Assignee: Central Motor Wheel Company Limited, Anjo, Japan

[21] Appl. No.: 198,768

[22] Filed: Feb. 18, 1994

[30] Foreign Application Priority Data

Feb. 19, 1993 [JP] Japan .................................. 5-030016

[51] Int. Cl.⁶ ............................................. B60B 23/00
[52] U.S. Cl. ...................................... 301/63.1; 301/95
[58] Field of Search ...................... 301/63.1, 65, 95, 97

[56] References Cited

U.S. PATENT DOCUMENTS 4,363,347  12/1982  Baumgartner .

FOREIGN PATENT DOCUMENTS 2523356  12/1975  Germany ............................ 301/63.1
3503882   8/1986  Germany ............................ 301/63.1
8071202   4/1983  Japan .................................. 301/63.1
0099402   4/1990  Japan .................................... 301/95
3-40030   3/1991  Japan .

*Primary Examiner*—Russell D. Stormer
*Attorney, Agent, or Firm*—Pollock, Vande Sande & Priddy

[57] ABSTRACT

In order to prolong the durability of a disk wheel which is determined by a dynamic radial fatigue test, the disk wheel for an automobile comprising a rim and a disk which are drop portion-engaged with each other, has a construction such that it includes a plurality of humps provided on an outer peripheral surface of the disk facing the rim, the humps being formed at positions away from welded portions between the disk and the rim in such a manner as to extend with intervals in the circumferential direction, so that the outer peripheral surfaces of the hump are press-fitted against the rim.

3 Claims, 7 Drawing Sheets

DISK WHEEL FOR AUTOMOBILE

BACKGROUND OF THE INVENTION

1. Field of the Invention

The present invention relates to a disk wheel for an automobile, and more particularly, to an improved disk wheel in which satisfactory durability of a disk/rim welded portion is obtained in a dynamic radial fatigue test.

2. Description of Related Art

Figure 12:
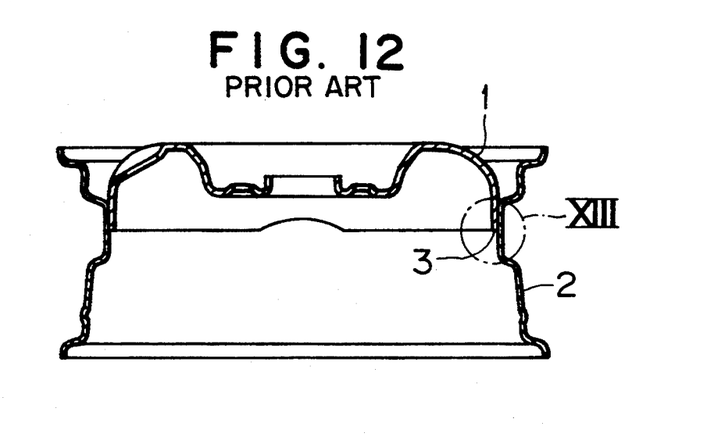
FIG. 12 is a longitudinally cross-sectional view of a conventional disk wheel.

As shown in FIG. 12, there is a known disk wheel made of plate material for an automobile in which a disk 1 is fitted in an inner periphery of a rim 2, the disk and the rim being welded and connected to each other at a welded portion designated by reference numeral 3.

Figure 13:
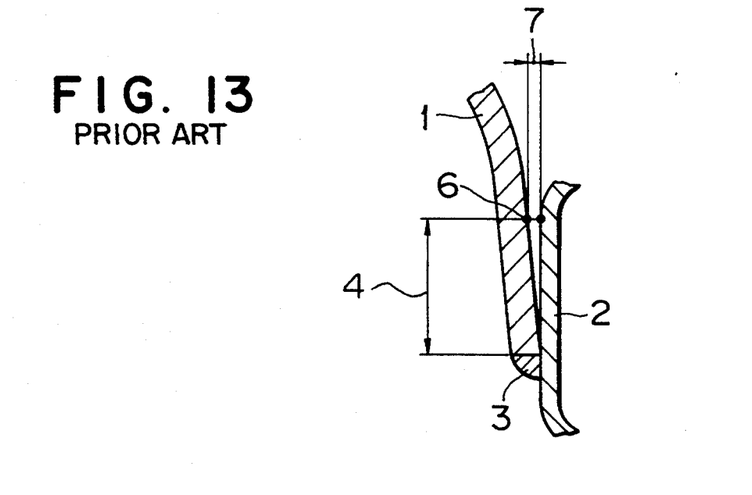
FIG. 13 is a view showing a portion A of FIG. 12 on an enlarged scale.

A portion A of FIG. 12 is shown in FIG. 13 on an enlarged scale. In this type of disk wheel, as shown in FIG. 13, a flange at a lower portion 4 of the disk 1 formed by a plastic working method comes to a tapered shape in such a manner that the diameter of the disk at the distal end (the lower end in the drawing) is larger than that at the proximal portion 6.

Consequently, when the disk 1 is fitted in the rim 2, as shown in FIG. 13, a radial clearance 7 is defined between the outer periphery of the proximal portion 6 of the flange portion 4 of the disk 1 and the inner periphery of the rim 2.

Under such a condition, when a dynamic radial fatigue test is carried out for the disk wheel, stress concentration is caused at the welded portion 3 so that the fatigue limit life at this portion is severely shortened. As a result, there occurs a crack in the welded portion 3.

In order to prevent the occurrence of the crack in the welded portion 3 in the dynamic radial fatigue test so as to prolong the fatigue limit life, it is necessary to take measures for closely fitting the outer periphery of the flange portion 4 of the disk 1 in the inner periphery of the rim 2 so that the clearance 7 therebetween is minimized.

Concretely, any of the following measures (1) to (3) has been performed for solving the above problem.

(1) A fitting interference of the disk 1 with respect to the rim 2 is increased to fit more closely.

Figure 14:
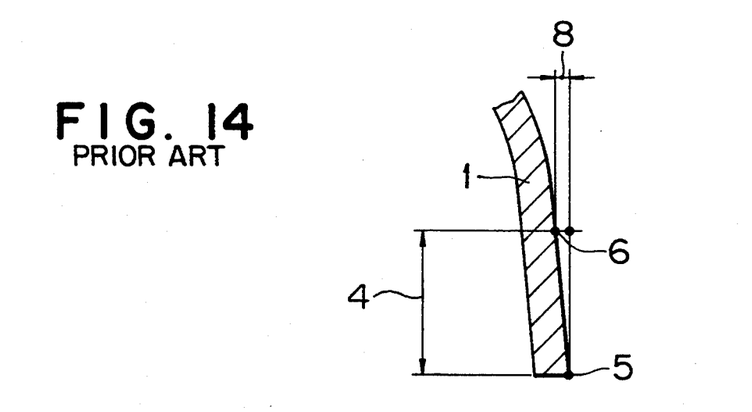
FIG. 14 is a view partially illustrative of a disk of the conventional disk wheel in cross section.

(2) In order to minimize an amount 8 of taper of the flange portion 4 of the disk 1 illustrated in FIG. 14, in the step of drawing the flange portion 4, a clearance between dies is reduced as much as possible.

Figure 15:
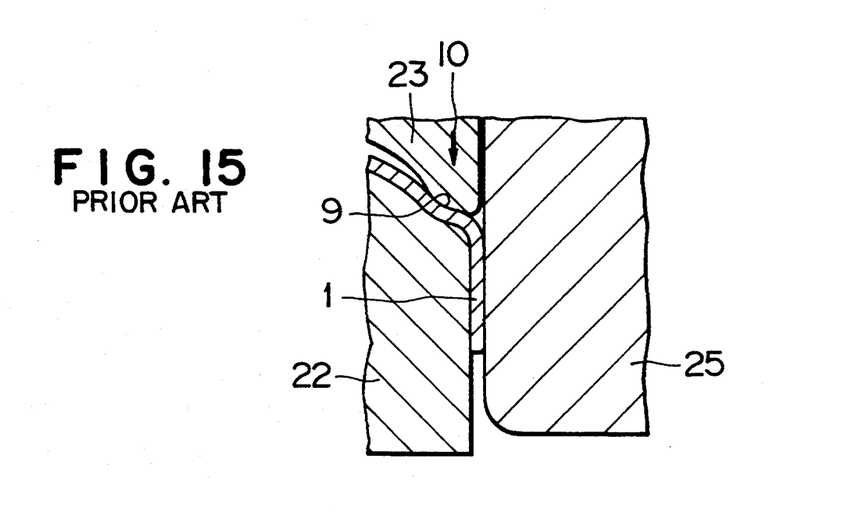
FIG. 15 is a longitudinal cross-sectional view for explaining a part of a working step of a flange portion of the disk according to the prior art.

(3) When the disk 1 is formed by drawing, as shown in FIG. 15, the disk 1 is held between an annular drawing ring 25 and a molding punch 22, and it is strongly pressed by a molding die 23 in a direction of an arrow 10, thereby forming an arc-shape indicated by numeral 9 over the whole circumference of the disk 1. A dimension of the drawing ring 25 is so determined that an outer diameter of the disk 1 becomes a desired value.

In the measure (1) of the prior art, when the fitting interference is increased in order to establish sufficiently close contact between the disk 1 and the rim 2, a strong fitting force is required when the disk 1 is fitted in the rim 2. Accordingly, there occurs a scratch during fitting of the disk in the rim, which impairs a value of the disk wheel as a product. Also, due to the strong fitting force, the disk 1 and the rim 2 are sometimes deformed so as to lower an accuracy of the disk wheel.

In the measure (2) of the prior art, seizure occurs between the dies during forming the flange portion 4 because the clearance between the dies is reduced, so that there occur a lot of dimensional faults of the disk 1 or loss of much labor resulting from tedious adjustment of the dies. As a result, the productivity becomes worse.

In the measure (3) of the prior art, a degree of deformability of a member to be worked in correspondence to the inner periphery of the drawing ring 25 changes due to variation of forming conditions or variation in shut-height during processing of the member, or variation in thickness of the member to be worked. It is thus difficult to stabilize the dimension of the member to be worked. As a result, the durability of the product is liable to be unstable. Some of the products unfavorably have the short durability.

SUMMARY OF THE INVENTION

In view of the above, an object of the present invention resides in providing a disk wheel for an automobile which can solve the aforesaid problems.

To achieve the above object, a disk wheel of plate material for an automobile according to the invention comprises a rim and a disk which are drop portion-engaged with each other, wherein a plurality of humps are provided on an engaging surface of the disk facing the rim, the humps being formed at positions away from welded portions between the disk and the rim in the axial direction of the disk in a manner such as to extend with intervals in the circumferential direction, so that the outer peripheral surfaces of the humps are press-fitted against the inner peripheral surface of the rim.

It is more effective if the hump extends over the welded portion in the circumferential direction.

Incidentally, the above drop portion-engagement of the disk with the rim means that a center disk is fitted into the bed portion or drop well portion of the rim and is welded.

DESCRIPTION OF THE PREFERRED EMBODIMENTS

A first embodiment according to the present invention will now be described with reference to FIGS. 1 to 5.

The number of steps for forming a wheel disk is normally 5 to 10. A step of forming a flange portion of the disk is ordinarily at the middle step in the multiple steps.

Figure 1:
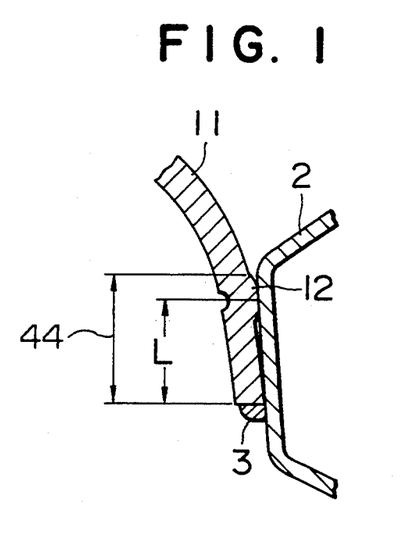
FIG. 1 is a longitudinally cross-sectional view of essential portions of a disk wheel according to a first embodiment of the invention.
Figure 2:
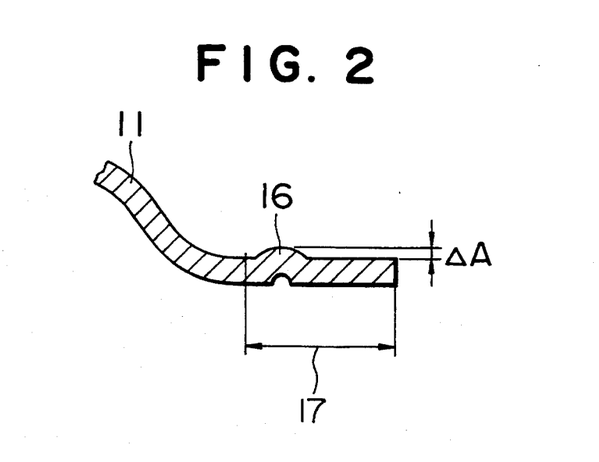
FIG. 2 is a cross-sectional view of a part of a disk, which has been processed in an intermediate working step, according to the first embodiment of the invention.
Figure 4:
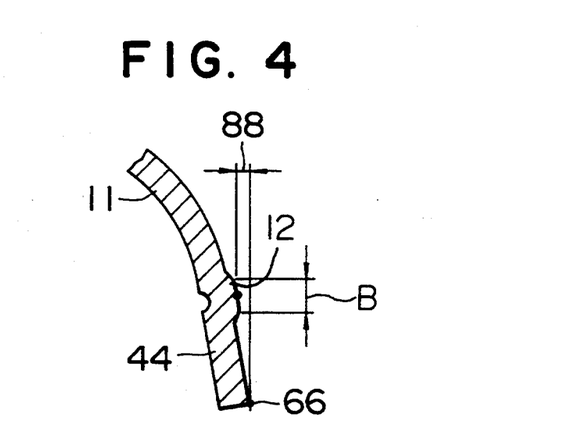
FIG. 4 is a cross-sectional view of a part of the disk which has been worked in the step of FIG. 3.

Before forming the flange portion 44 shown in FIGS. 1 and 4 on the disk 11, an outer periphery of the disk (i.e., a portion to finally become the flange portion 44) is formed in a flat portion 17 as shown in FIG. 2.

Referring to FIG. 2, the flat portion 17 has a so-called brim-like shape. The brim-like flat portion 17 includes on its upper surface a plurality of preformed humps 16 extending in the circumferential direction of the flat portion 17 at equal intervals. A height of each preformed hump 16 (designated by ΔA in FIG. 2) is predetermined so that the diameter of the disk at the top of the hump is larger than the diameter at the lower end of the flange portion when the flange portion 44 is made by bending (drawing) the flat portion 17.

A distance from the lower end of the flange portion formed by the bending process to the top of the hump in a direction of the axis of the disk (designated by reference numeral L in FIG. 1) is selected at a value as large as possible. Further, the distance L is predetermined so that humps 12 are conformably fitted in an inner periphery of a rim 2 (see FIG. 1).

Figure 3:
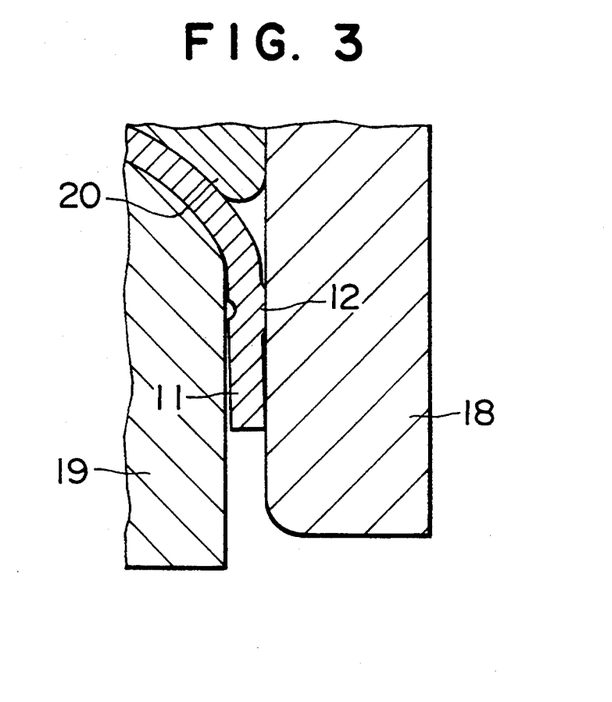
FIG. 3 is a longitudinally cross-sectional view for explanation of a step of working a flange portion of the disk according to the embodiment of the invention.

The disk 11 in FIG. 2 at the middle stage of the formation steps is drawn by an annular drawing ring 18, a forming punch 19 and a forming die 20 in the next step, as shown in FIG. 3. As a result, the preformed humps 16 are pressed against an inner periphery of the drawing ring 18 so that the preformed humps 16 in FIG. 2 having arc-shaped tops in cross section are plastically deformed in conformity with the inner peripheral cylindrical surface of the drawing ring 18. Accordingly, as illustrated in FIG. 3, the humps 12 do not have arc-shaped top surfaces as shown in FIG. 2, but straight top surfaces along the inner periphery of the drawing ring 18. These humps constitute partially a cylindrical surface extending along the inner peripheral surface of the drawing ring 18.

The top surfaces of the humps 12 on the thus-drawn disk 11 are straight over a length B in the longitudinal direction of FIG. 4. In FIG. 4, numeral 66 denotes a lower end outer periphery of the flange portion 44, and numeral 88 denotes a distance from a phantom line passing through the top of the lower end outer periphery 66 of the disk in parallel with the axis of the disk to a phantom line passing through the top of the surface of the hump 12 in parallel with the axis of the disk.

Figure 5:
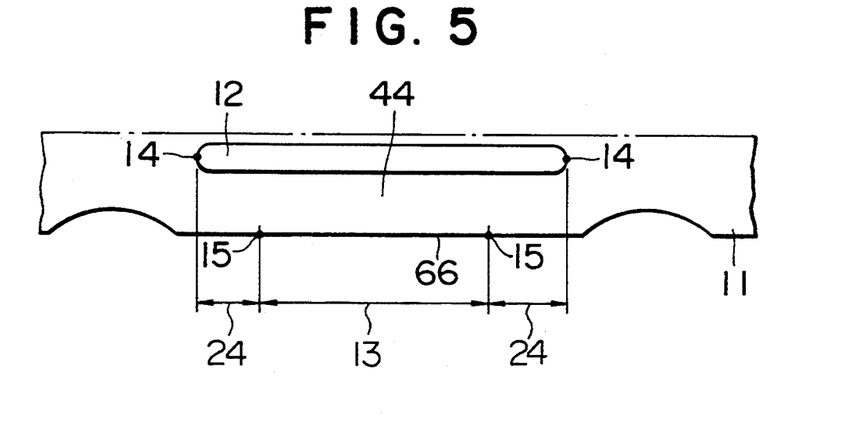
FIG. 5 is a partial view of the disk according to the embodiment of the invention when it is vertically cut and flattened in the circumferential direction.

FIG. 5 is a partial view of the disk 11 which is vertically cut and flattened in the circumferential direction. The lower end 66 of the flange portion 44 is welded and connected to the inner periphery (not shown) of the rim 2 over the length indicated by numeral 13.

The length of the hump 12 in the circumferential direction of the disk 11 is predetermined so that the hump 12 extends over the welded portion 13 in the circumferential direction; in the drawing, both circumferential ends 14, 14 of the hump 12 exist on the outsides of both circumferential ends 15, 15 of the welded portion 13 in the circumferential direction by distances designated by numerals 24, 24.

As shown in FIG. 3, when the flange portion of the disk 11 is formed by the bending (drawing) process, a member to be worked which is previously provided with the preformed humps 16 as illustrated in FIG. 2, is processed by the drawing ring 18 of which the inner diameter is set to be equal to the predetermined outer diameter of the disk 11. In the above case, even if a clearance between the drawing ring 18 and the forming punch 19 is increased to such an extent that there occurs no seizure between the ring and the punch, the outer diameter of the disk 11 at the position of the hump 12 becomes equal to the predetermined outer diameter size. Moreover, the humps 12 can be formed at the desirable positions in the axial direction of the disk 11, and the lengths of the humps 12 in the axial direction become equal to the predetermined values.

As mentioned above, the preformed humps 16 indicated by ΔA in FIG. 2 are previously formed and deformed in the step of FIG. 3, thereby forming the humps 12 in conformity of the inner periphery of the drawing ring 18. Consequently, even if there is a variation in heights of the humps ΔA of FIG. 2, the disk is finished so that the outer diameter of the disk at the humps 12 after forming the flange portion accurately corresponds to the inner diameter of the drawing ring 18. As a result, the difference 88 between the outer diameters at the lower end 66 and at the proximal portion shown of the flange portion in FIG. 4, that is, an amount of taper of the flange portion is advantageously minimized.

Because the humps 12 are deformed by the drawing ring 18 in the working step of FIG. 3, the flat surface having the width B in the axial direction of the disk 11 shown in FIG. 4 (strictly speaking, a portion of the cylindrical surface) can surely be obtained.

In this way, for the reasons that the amount of taper of the flange portion is minimized and that the hump 12 can surely have the flat surface with the width B, even if a fitting interference when the disk is fitted in the rim is small, the disk 11 and the rim 2 are in closer contact with each other, so that the fatigue limit life at the dynamic radial fatigue test of the disk wheel can be lengthened.

Figure 6:
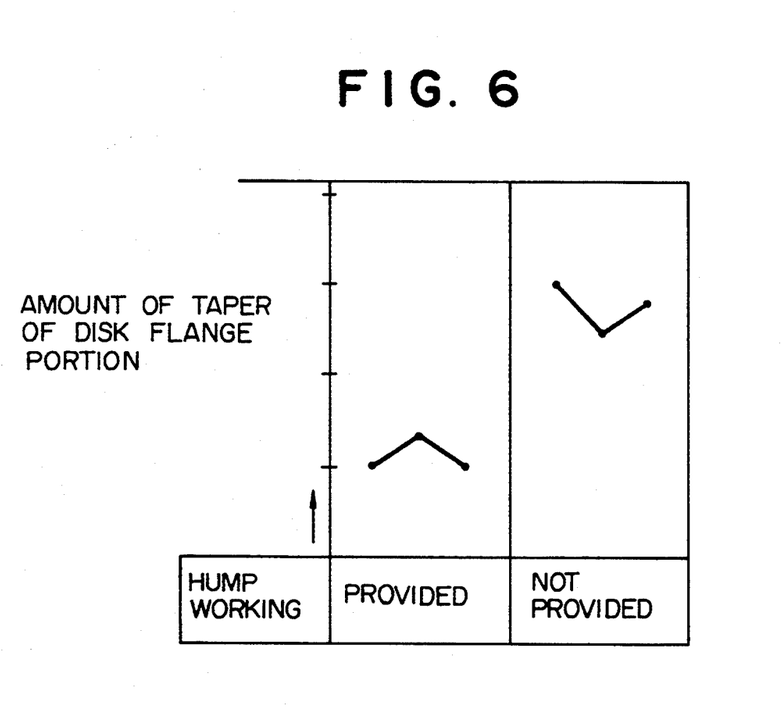
FIG. 6 is a diagram showing a relation between the existence of humps and an amount of taper in the disk flange portion and a relation between no existence of the humps and the latter.

Amounts of taper of the disk flange portion when the humps are formed and when they are not formed are compared in FIG. 6. The taper amount in the present invention in which the humps are formed is smaller than the case where the humps are not formed. Accordingly, it is recognized that the invention can serve to lengthen the fatigue limit life.

Figure 7:
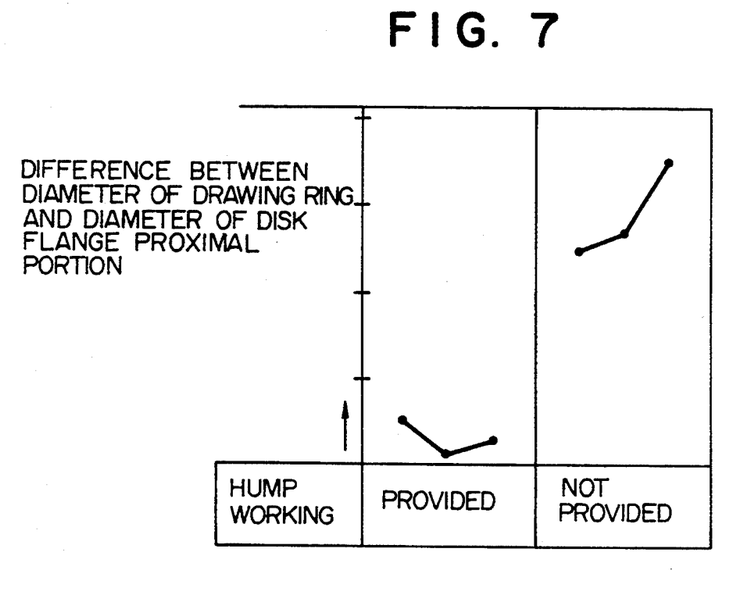
FIG. 7 is a diagram showing a relation between the existence of the humps in the disk flange portion and a difference in diameters of a drawing ring and the disk flange proximal portion and a relation between no existence of the humps and the latter.

FIG. 7 shows a difference between the diameter of the drawing ring die for forming the flange portion and the diameter of the disk 11 at the flange proximal portion when the humps are formed and such a difference when they are not formed. As clearly understood from FIG. 7, with the invention in which the humps are provided, the diameter of the disk at the flange proximal portion substantially corresponds to the inner diameter of the drawing ring more than the case in which the humps are not provided, and a variation of the disk diameter is small.

Further, according to the invention, it is possible to solve the difficulties in the above-described conventional working method such as: (1) a fitting interference between the rim and the disk is increased; (2) a clearance between the dies when the flange portion of the disk is formed is reduced as much as possible; and (3) an arc-shape is formed in the disk by forming dies so as to strongly press the disk against the rim.

Figure 8A:
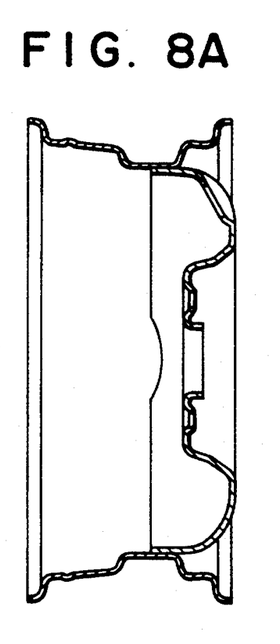
FIG. 8A is a longitudinally cross-sectional view of the disk wheel.
Figure 8B:
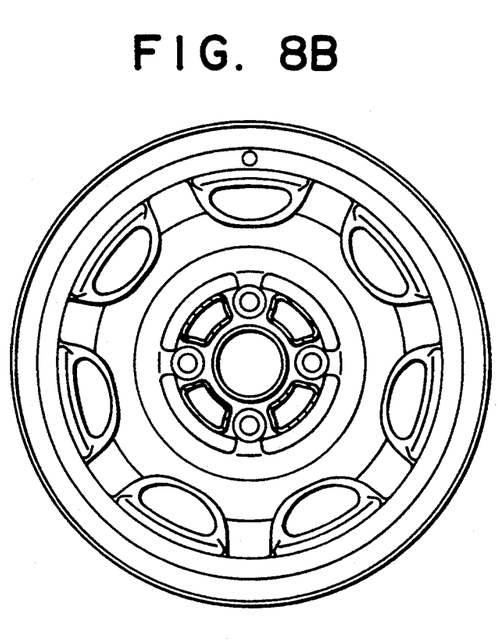
FIG. 8B is a front view of the disk wheel.
Figure 10:
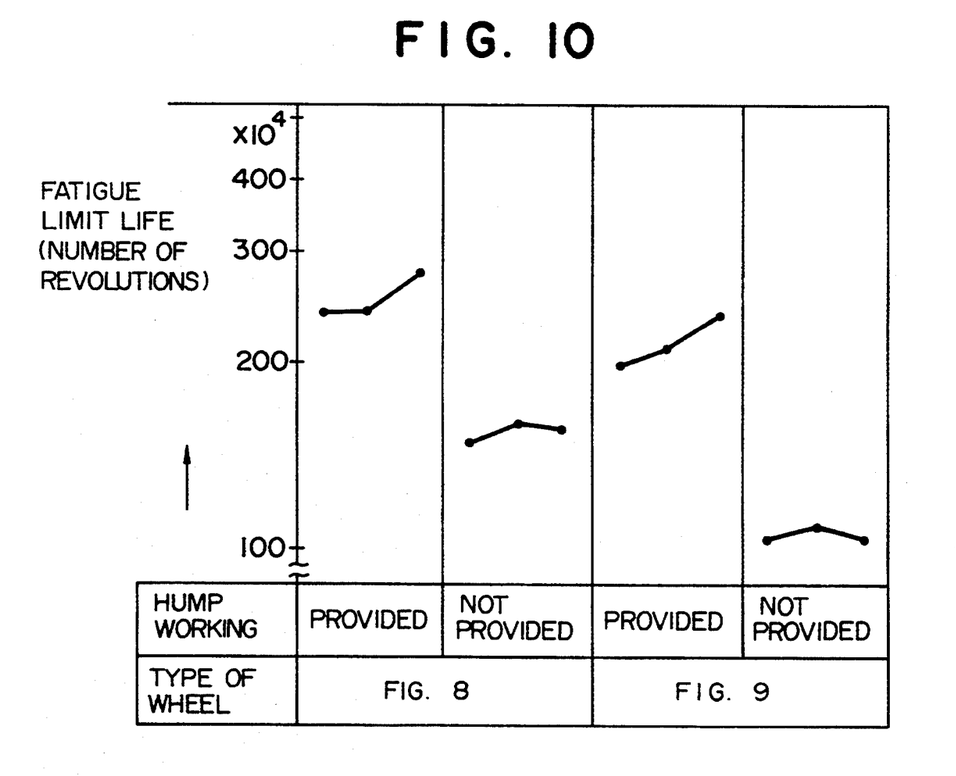
FIG. 10 is a diagram indicating a relation between the existence of the humps in the desk flange portion and the radial fatigue limit life of the disk wheel and a relation between no existence of the humps and the latter.

A disk wheel shown in FIGS. 8A and 8B is of a type in which a disk and a rim are in contact with each other over the whole circumference. As indicated in FIG. 10, the disk wheel including the humps according to the invention has a fatigue limit life about twice longer than the disk wheel including no humps according to the prior art.

Figure 9A:
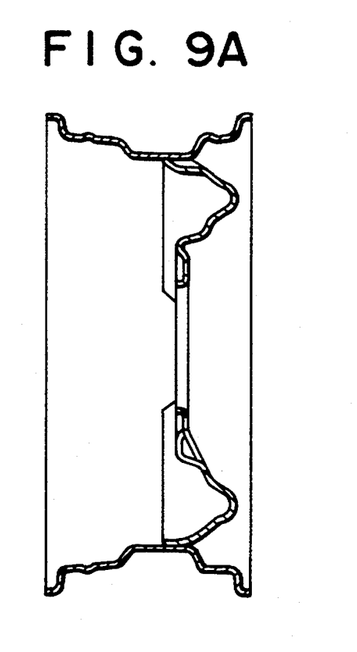
FIG. 9A is a longitudinally cross-sectional view of a disk wheel of another embodiment.
Figure 9B:
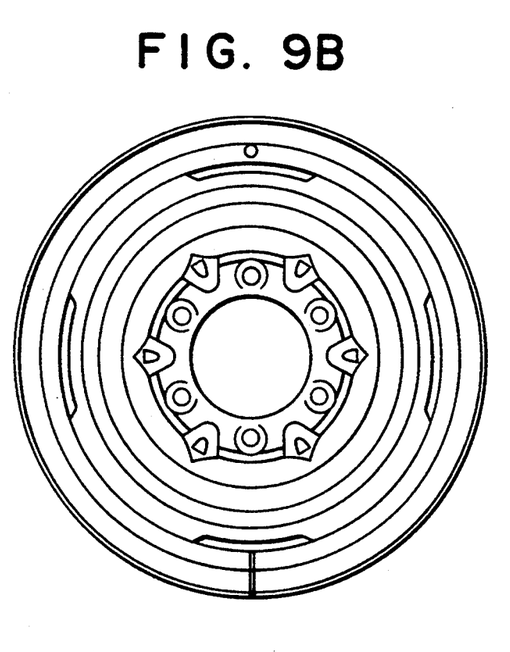
FIG. 9B is a front view of the disk wheel.

A disk wheel shown in FIGS. 9A and 9B is of a type in which a disk and a rim are in contact with each other at four portions in the circumferential direction. Similarly, the disk wheel including the humps according to the invention has a fatigue limit life about twice longer than the disk wheel including no humps according to the prior art.

Additionally, the fitting interferences of the disk wheels in FIGS. 8A, 8B and FIGS. 9A, 9B when the humps are provided are the same as those when the humps are not provided. In the test, the load applied to the disk wheel of the type of FIGS. 8A, 8B is 9.5 kN and the load applied to the disk wheel of the type of FIGS. 9A, 9B is 19.0 kN.

Figure 11:
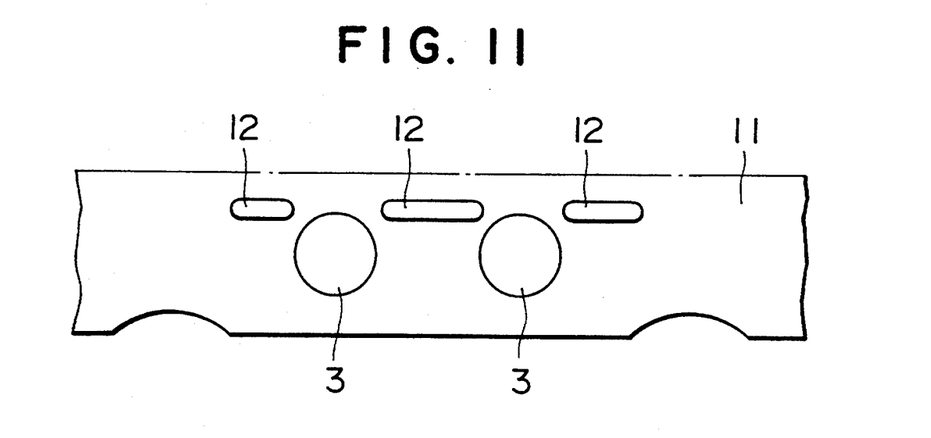
FIG. 11 is a partial view of a disk according to another embodiment of the invention when it is vertically cut and flattened in the circumferential direction.

FIG. 11 is a partial view of a disk 11 according to another embodiment of the invention which is vertically cut and flattened in the circumferential direction. In FIG. 11, numeral 12 denotes humps and numeral 3 denote spot welded portions. In this embodiment, the number of the humps is larger than that of the first embodiment.

Since the disk wheel for an automobile according to the invention is constructed as mentioned above, such difficulties as the increase of the fitting interference between the rim and the disk, the reduction of the clearance between the dies and the necessity of strong pressure for forming the arc-shape by the forming dies, can be solved, and the durability at the dynamic radial fatigue test can be prolonged.

What is claimed is:

1. A disk wheel of plate material for an automobile comprising a rim and a disk which are drop portion-engaged with each other, wherein a plurality of humps are disposed to form an engaging surface on the outer periphery of said disk facing said rim, said disk and said rim being welded to each other to form a plurality of welded portions, said humps being disposed at positions substantially across from said welded portions between said disk and said rim in the axial direction of said disk and spaced along said engaging surface, wherein the outer peripheral surfaces of said humps are press-fitted against said rim.

2. A disk wheel of plate material for an automobile comprising a rim and a disk which are drop portion-engaged with each other, to form an engaging surface, and a plurality of humps which are disposed along said engaging surface on the outer periphery of said disk facing said rim, each of said humps having a substantially flat top surface in contact with said rim, said disk and said rim being welded to each other to form a plurality of welded portions in the circumferential direction of said disk and said rim, wherein each of said welded portions is substantially aligned with each of the corresponding humps in the axial direction of said disk and said rim.

3. A disk wheel for an automobile according to claim 1, wherein each of said humps extends over each of the corresponding welded portions in the circumferential direction of said disk and said rim.

* * * * *